US012803399B2

(12) United States Patent
Katsume et al.

(10) Patent No.: US 12,803,399 B2
(45) Date of Patent: Nov. 17, 2026

(54) ROTOR MANUFACTURING METHOD

(71) Applicant: SUBARU CORPORATION, Tokyo (JP)

(72) Inventors: Akihito Katsume, Tokyo (JP); Seiya Morimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 737 days.

(21) Appl. No.: 18/331,372

(22) Filed: Jun. 8, 2023

(65) Prior Publication Data

US 2024/0006969 A1 Jan. 4, 2024

(30) Foreign Application Priority Data

Jul. 1, 2022 (JP) ................................ 2022-106802

(51) Int. Cl.

| | |
|---|---|
| ***H02K 15/165*** | (2025.01) |
| ***H02K 1/276*** | (2022.01) |
| ***H02K 1/28*** | (2006.01) |
| ***H02K 15/03*** | (2025.01) |
| ***H02K 15/12*** | (2025.01) |

(52) U.S. Cl.

CPC ........... *H02K 15/165* (2013.01); *H02K 1/276* (2013.01); *H02K 1/28* (2013.01); *H02K 15/03* (2013.01); *H02K 15/12* (2013.01)

(58) Field of Classification Search

CPC .......... H02K 1/276; H02K 1/28; H02K 15/03; H02K 15/12; H02K 15/165

See application file for complete search history.

(56) References Cited

U.S. PATENT DOCUMENTS

| | | | |
|---|---|---|---|
| 2016/0013709 | A1 | 1/2016 | Nagai et al. |
| 2018/0041080 | A1 | 2/2018 | Nakano et al. |

FOREIGN PATENT DOCUMENTS

| | | | |
|---|---|---|---|
| JP | 2006-211748 | A | 8/2006 |
| JP | 2016-019381 | A | 2/2016 |
| JP | 6182841 | B2 * | 8/2017 |
| JP | 2018-068073 | A | 4/2018 |
| JP | 2021-141800 | A | 9/2021 |

OTHER PUBLICATIONS

Notice of Reasons for Refusal mailed Feb. 24, 2026 for Japanese Patent Application No. 2022-106802 (2 pages in Japanese; 3 pages English translation).

* cited by examiner

*Primary Examiner* — Minh N Trinh

(74) *Attorney, Agent, or Firm* — Smith, Gambrell & Russell, LLP

(57) ABSTRACT

A manufacturing method of a rotor having insertion holes arranged in a circumferential direction around an axis and a magnet and resin placed in each insertion hole includes: a first step of placing the magnet and resin in each first insertion hole, and identifying an unbalance position by rotating the rotor at a first rotation speed; a second step of placing the magnet and resin in each second insertion hole in which the magnet is not placed in the first step, and rotating the rotor at a second rotation speed; and a third step of placing the magnet and resin in each third insertion hole in which the magnet is not placed in the first step, and rotating the rotor at a third rotation speed smaller than the second rotation speed. The second and third insertion holes are relatively far from and close to the unbalance position respectively.

11 Claims, 7 Drawing Sheets

ROTOR MANUFACTURING METHOD

CROSS-REFERENCE TO RELATED APPLICATIONS

The present application claims priority from Japanese Patent Application No. 2022-106802 filed on Jul. 1, 2022, the entire contents of which are hereby incorporated by reference.

BACKGROUND

The disclosure relates to a manufacturing method of a rotor and the rotor.

A rotor used in a motor, which includes a stator and a rotor, is formed by inserting permanent magnets into magnet insertion holes that are formed in a circumferential direction of a laminated iron core body and sealing the magnet insertion holes with resin. In a process of manufacturing such a rotor, a technique of canceling an unbalance weight caused by a deviation of a lamination thickness in the circumferential direction of the laminated iron core body is described in Japanese Unexamined Patent Application Publication (JP-A) No. 2016-19381. In the technique described in JP-A No. 2016-19381, a step of estimating the unbalance weight by measuring the deviation of the lamination thickness in the circumferential direction of the laminated iron core body and a step of inserting permanent magnets into magnet insertion holes or filling the magnet insertion holes with resin so as to cancel the unbalance weight are performed. For example, permanent magnets having different weights are selectively inserted into the magnet insertion holes, placement positions of the permanent magnets in the magnet insertion holes are adjusted, or a filling amount of the resin with which the magnet insertion holes are filled is adjusted.

SUMMARY

An aspect of the disclosure provides a manufacturing method of a rotor to be used in a motor along with a stator. The rotor has insertion holes arranged in a circumferential direction around an axis of the rotor. The rotor includes a magnet and resin placed in each of the insertion holes. The manufacturing method of the rotor includes: a first step of placing the magnet and the resin in each of first insertion holes among the insertion holes, and identifying an unbalance position of the rotor by rotating the rotor at a first rotation speed; a second step of placing the magnet and the resin in each of second insertion holes among the insertion holes in which the magnet is not placed in the first step, and rotating the rotor at a second rotation speed; and a third step of placing the magnet and the resin in each of third insertion holes among the insertion holes in which the magnet is not placed in the first step, and rotating the rotor at a third rotation speed smaller than the second rotation speed. The second insertion holes are relatively far from the unbalance position. The third insertion holes are relatively close to the unbalance position.

An aspect of the disclosure provides a rotor to be used in a motor along a stator. The rotor has insertion holes arranged in a circumferential direction around an axis of the rotor. The rotor includes a magnet and resin placed in each of the insertion holes. The magnets and the resin are placed through: a first step of placing the magnet and the resin in each of first insertion holes among the insertion holes, and identifying an unbalance position of the rotor by rotating the rotor at a first rotation speed; a second step of placing the magnet and the resin in each of second insertion holes among the insertion holes in which the magnets are not placed in the first step, and rotating the rotor at a second rotation speed; and a third step of placing the magnet and the resin in each of third insertion holes among the insertion holes in which the magnets are not placed in the first step, and rotating the rotor at a third rotation speed smaller than the second rotation speed. The second insertion holes are relatively far from the unbalance position. The third insertion holes are relatively close to the unbalance position.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique described in JP-A No. 2016-19381, it is necessary to determine a weight and a placement position of a permanent magnet and a filling amount of resin based on the measured unbalance weight, and a process is complicated. When the weight of the permanent magnet is changed, performance of a motor may also be affected.

It is desirable to provide a manufacturing method of a rotor and the rotor, which can reduce or eliminate unbalance of a rotor by a simplified process without affecting performance of the motor.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
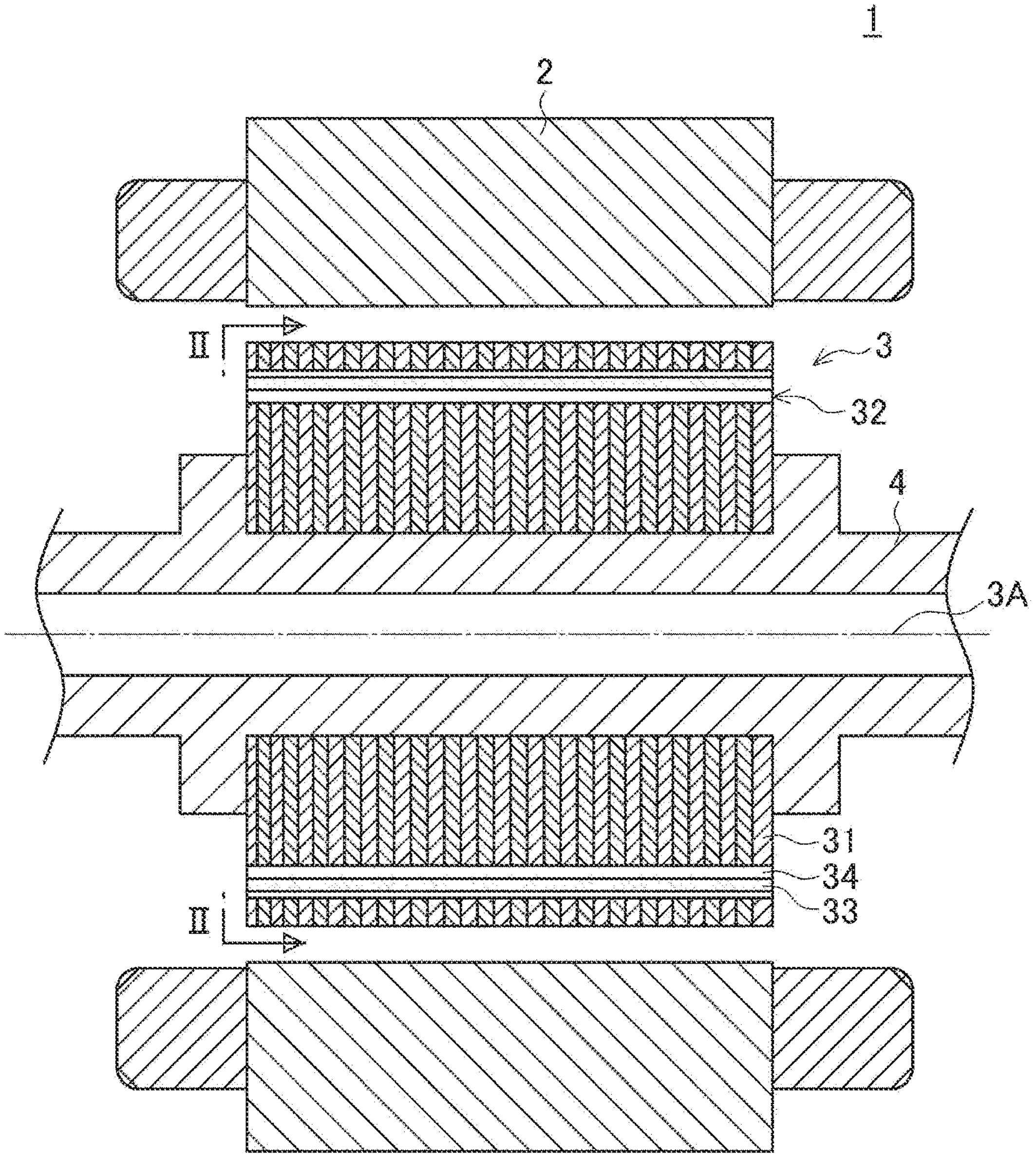
FIG. 1 is a cross-sectional view illustrating a motor according to an embodiment of the disclosure.
Figure 2:
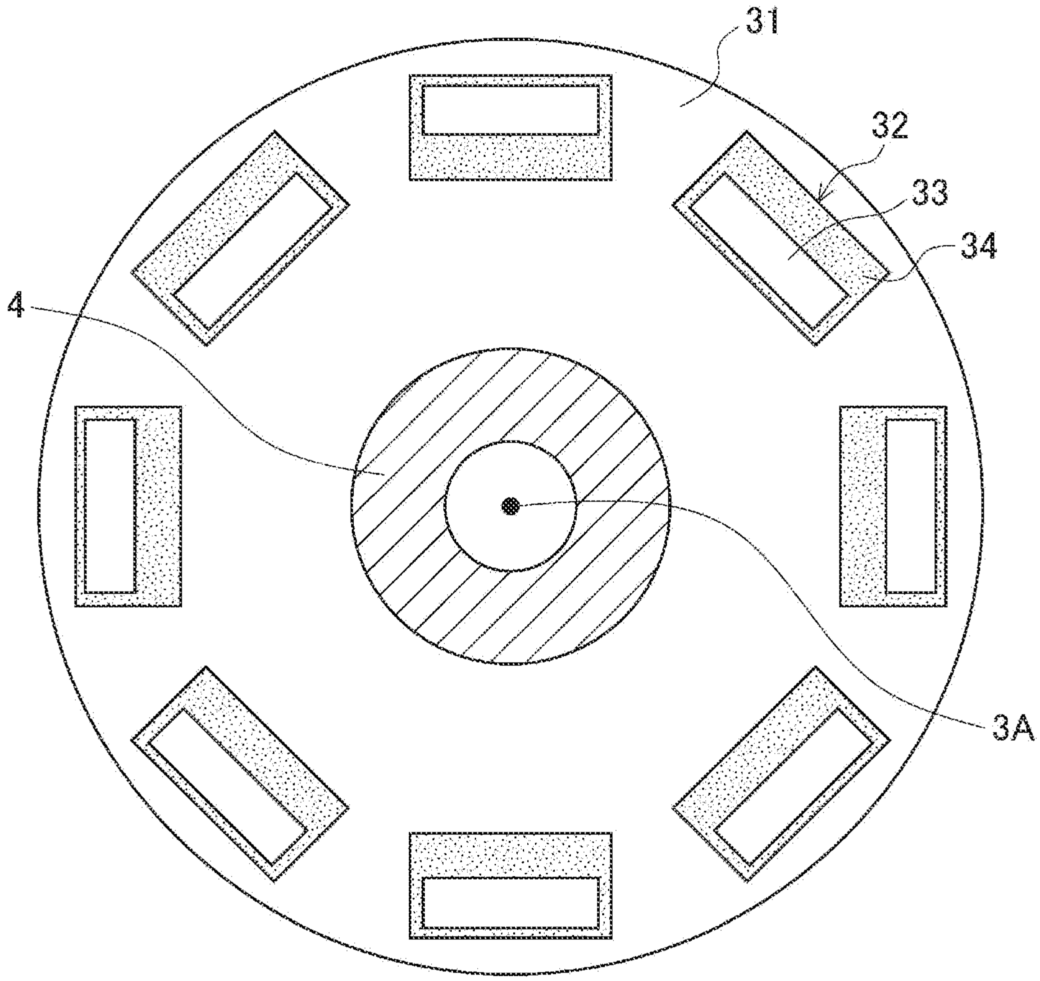
FIG. 2 is an arrow view taken along a line II-II in FIG. 1.

FIG. 1 is a cross-sectional view illustrating a motor according to an embodiment of the disclosure, and FIG. 2 is an arrow view taken along a line II-II in FIG. 1. As illustrated in FIG. 1, a motor 1 includes a stator 2 and a rotor 3. The rotor 3 is a part attached to a shaft 4 to rotate, and the stator 2 is a part fixed around the rotor 3. Since the stator 2, the shaft 4, and parts of the rotor 3 other than those described below can use a known configuration, a detailed description thereof is omitted.

The rotor 3 includes a main body 31 formed of a laminated iron core, insertion holes 32 formed in the main body 31, and magnets 33 and resin 34 placed in the insertion holes 32. The insertion holes 32 are arranged in a circumferential direction around an axis 3A of the rotor 3 and penetrate the main body 31 in an axial direction. Each magnet 33 is, for example, a rod-shaped permanent magnet having a length corresponding to that of the insertion hole 32. Although a cross-sectional shape of the insertion hole 32 is not limited, the insertion hole 32 has, for example, a rectangular cross-sectional shape larger than that of the magnet 33 as illustrated in FIG. 2. A cross-sectional shape of the magnet 33 is also not limited, and is, for example, a rectangular cross-sectional shape. A gap between a wall surface of the insertion hole 32 and the magnet 33 is filled with the resin 34. The resin 34 is, for example, a thermosetting resin such as an epoxy resin or a thermoplastic resin. Hereinafter, a step of placing the magnets 33 and the resin 34 in the insertion holes 32 will be further described.

Figure 3:
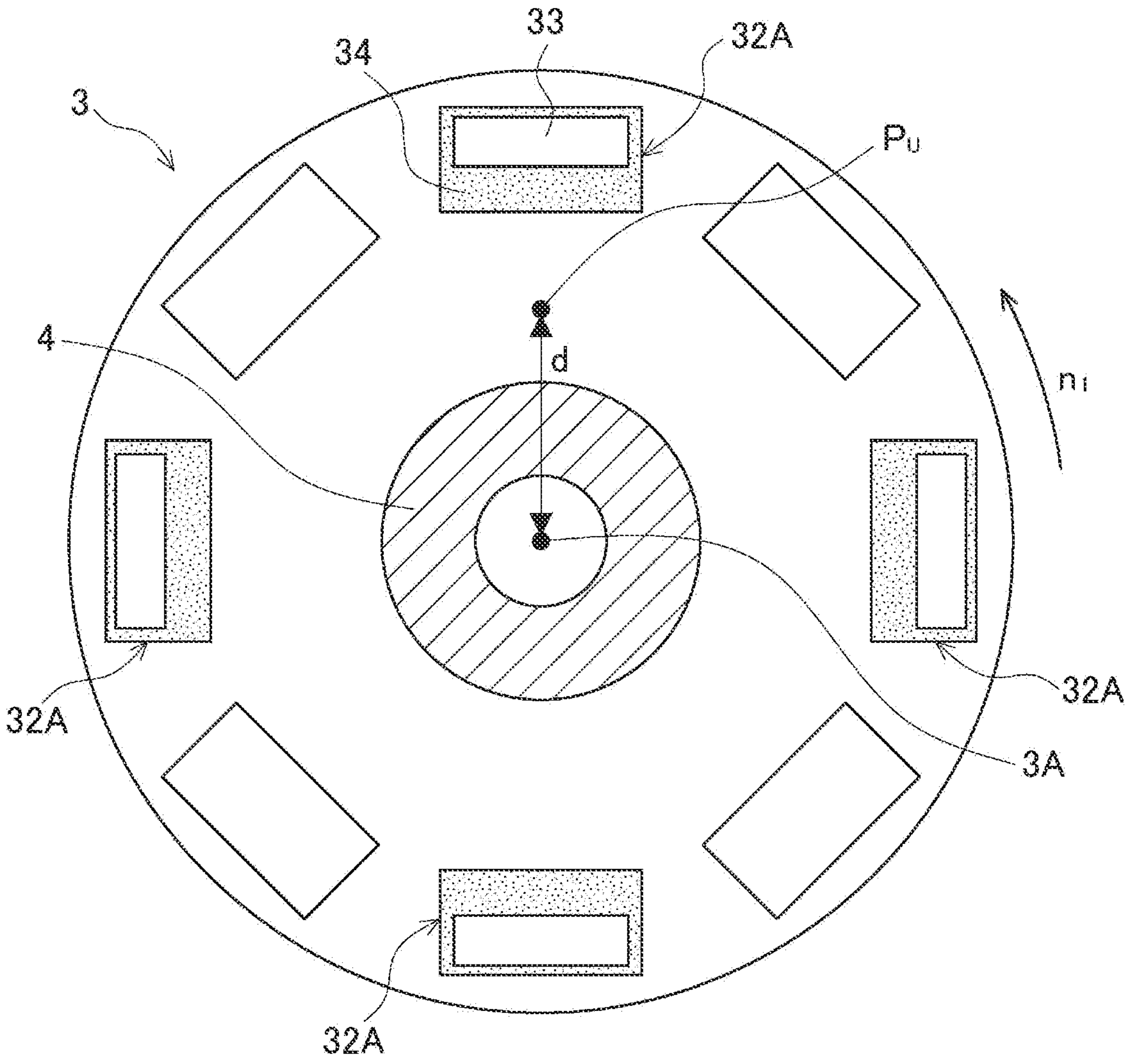
FIG. 3 is a view illustrating a first step of a manufacturing method of a rotor according to the embodiment of the disclosure.

FIG. 3 is a view illustrating a first step of a manufacturing method of a rotor according to the embodiment of the disclosure. The first step is performed after the rotor 3 is attached to the shaft 4 so as to be rotatable. In the first step, the magnet 33 and the resin 34 are placed in a first group of insertion holes 32A among the insertion holes 32, and an unbalance position $P_U$ is specified by rotating the rotor 3 at a first rotation speed $n_1$. The first group of insertion holes 32A are a part of the insertion holes 32, and are set at equal intervals in the circumferential direction in which the insertion holes 32 are arranged. That is, a next insertion hole 32 belonging to the first group of insertion holes 32A is present by skipping one or multiple insertion holes 32 in the circumferential direction from the insertion hole 32 belonging to the first group of insertion holes 32A. The unbalance position $P_U$ is a position of a mass axis when unbalance occurs in the rotor 3, that is, when the mass axis during rotation does not coincide with the axis 3A. For example, the unbalance position $P_U$ is specified by measuring a rotation phase of the rotor 3 and a vibration waveform of a circumferential surface of the rotor 3.

In the embodiment, a distance d from the axis 3A to the unbalance position $P_U$ may not be necessarily measured as long as which direction the unbalance position $P_U$ is located with respect to the axis 3A of the rotor 3 can be specified in the first step.

Figure 4:
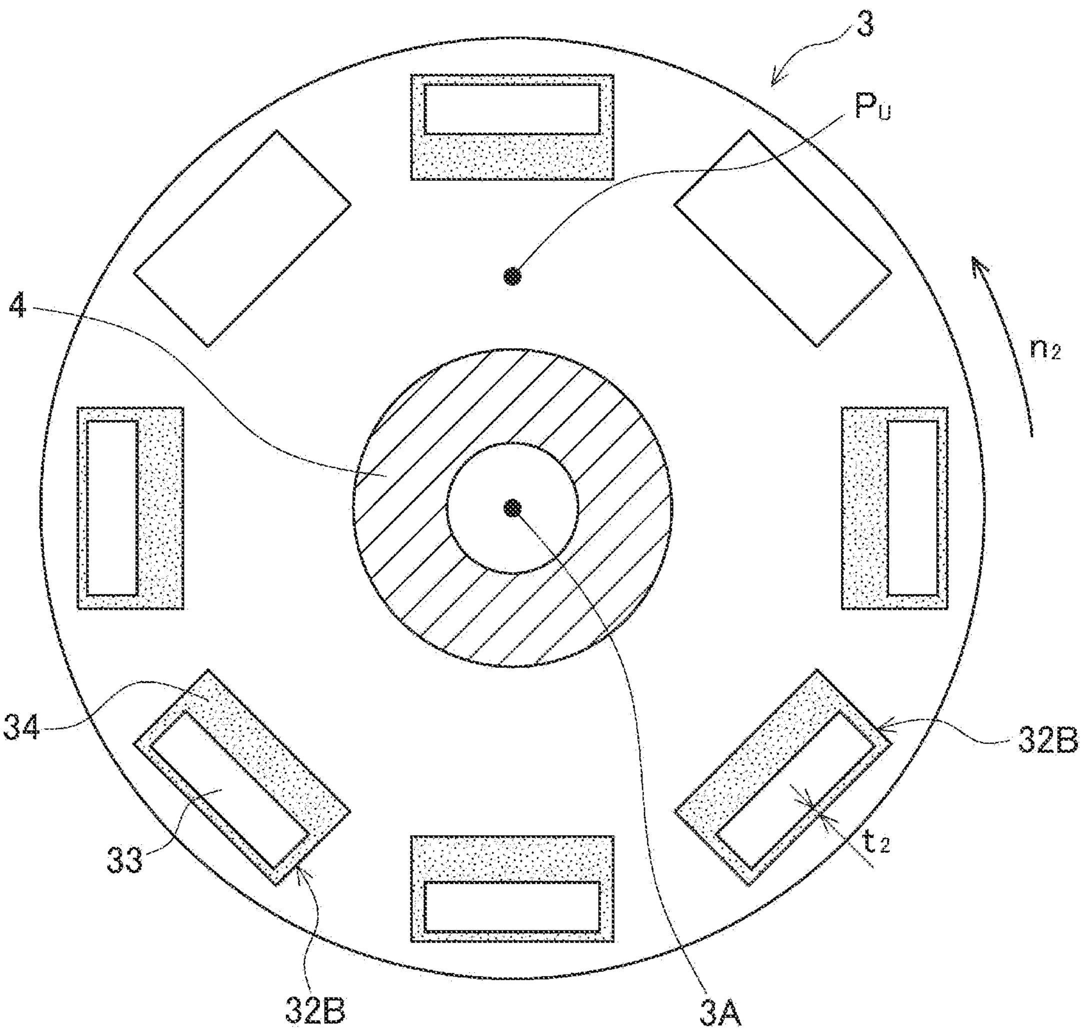
FIG. 4 is a view illustrating a second step of the manufacturing method of a rotor according to the embodiment of the disclosure.

FIG. 4 is a view illustrating a second step of the manufacturing method of a rotor according to the embodiment of the disclosure. The second step is performed after the first step. In the second step, the magnet 33 and the resin 34 are placed in a second group of insertion holes 32B that are relatively far from the unbalance position $P_U$ specified in the first step among the insertion holes 32 in which the magnets 33 are not placed in the first step, and the rotor 3 is rotated at a second rotation speed $n_2$. The second rotation speed $n_2$ in the second step may be, for example, equal to or smaller than the first rotation speed $n_1$ in the first step as in an example to be described later, but is not particularly limited.

Figure 5:
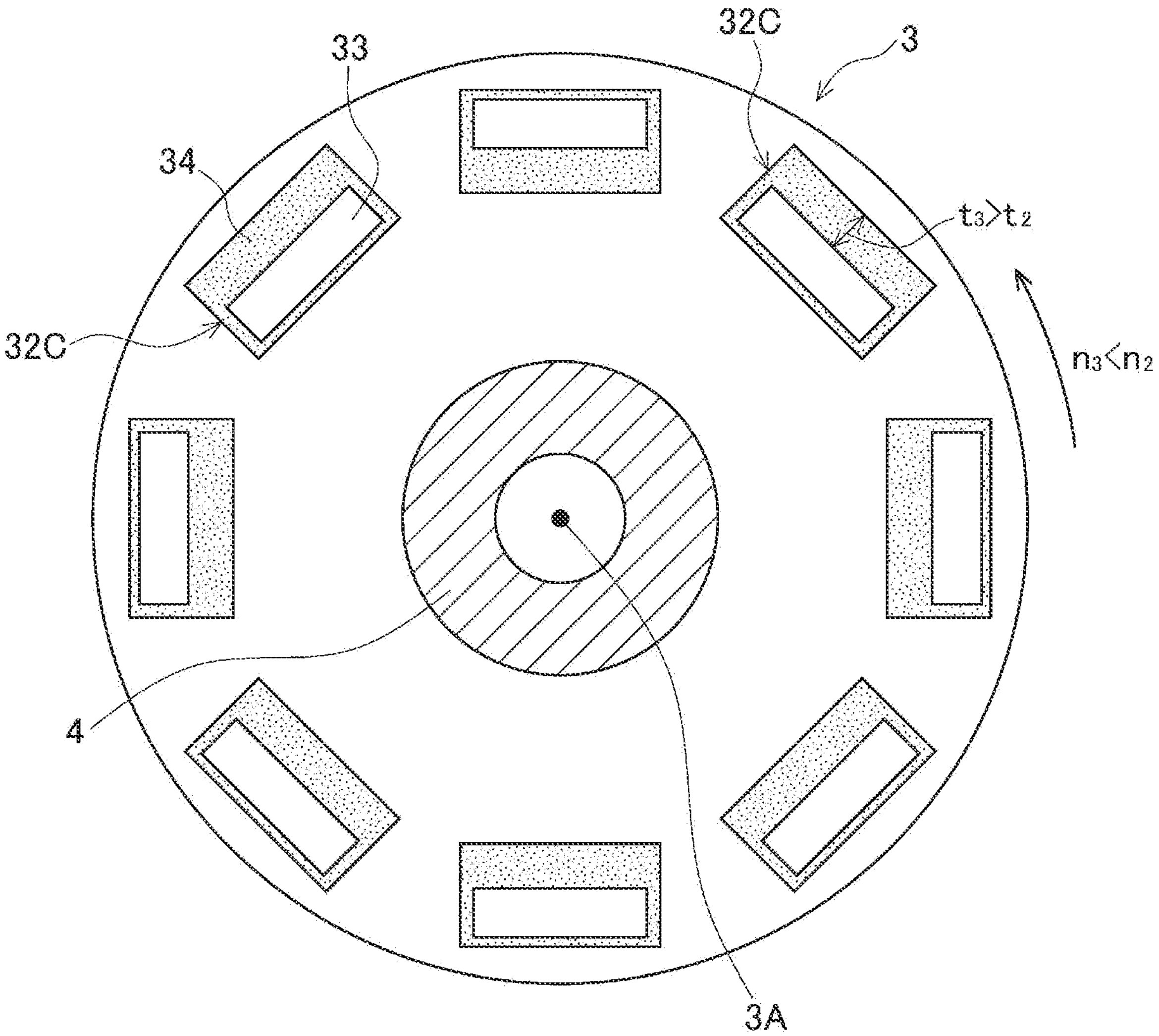
FIG. 5 is a view illustrating a third step of the manufacturing method of a rotor according to the embodiment of the disclosure.

FIG. 5 is a view illustrating a third step of the manufacturing method of a rotor according to the embodiment of the disclosure. The third step is performed after the second step. In the third step, the magnet 33 and the resin 34 are placed in a third group of insertion holes 32C that are relatively close to the unbalance position $P_U$ specified in the first step among the insertion holes 32 in which the magnets 33 are not placed in the first step, and the rotor 3 is rotated at a third rotation speed $n_3$. The third rotation speed $n_3$ in the third step is smaller than the second rotation speed $n_2$ in the second step.

Figure 6:
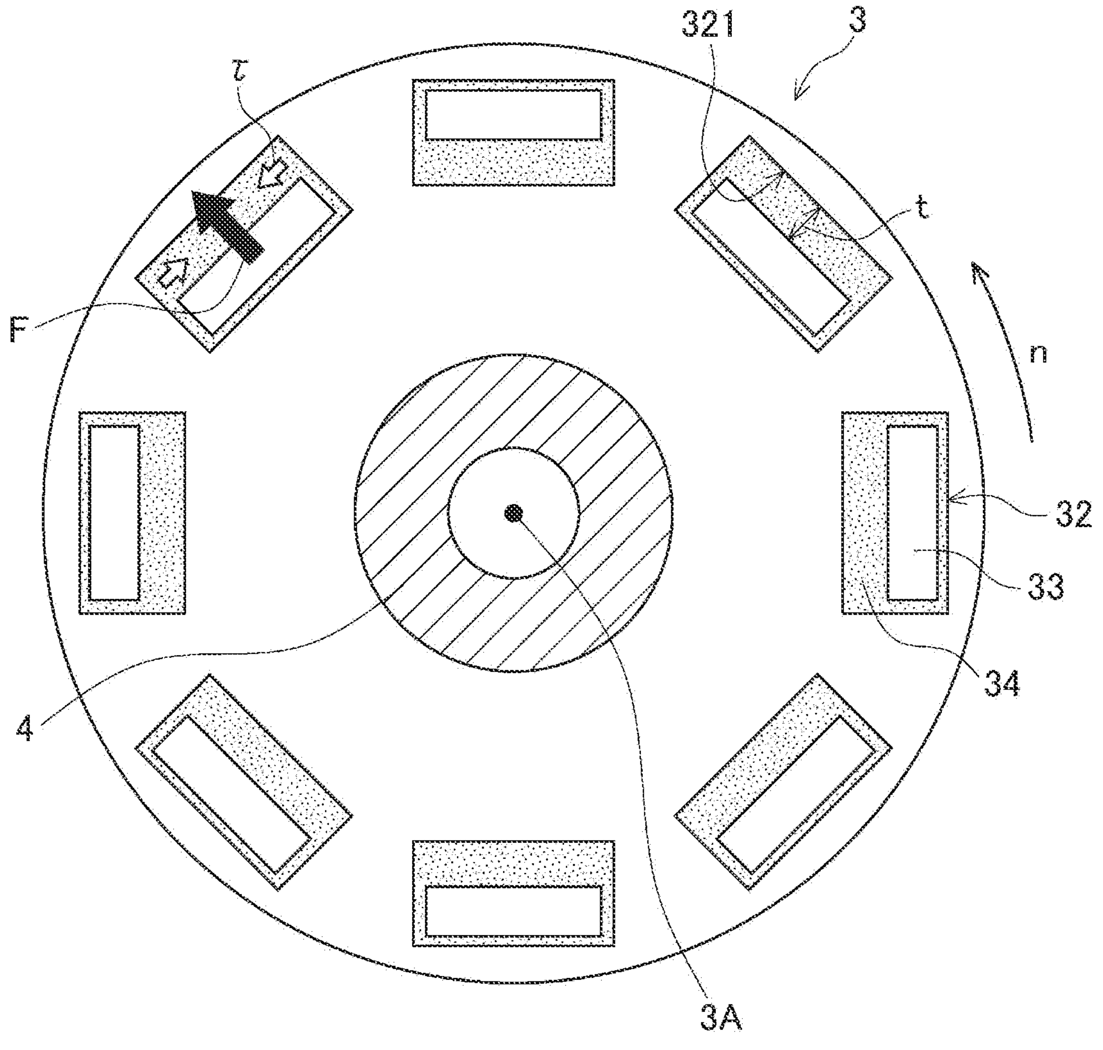
FIG. 6 is a view illustrating a force acting on a magnet and resin placed in an insertion hole.

FIG. 6 is a view illustrating a force acting on a magnet and resin placed in an insertion hole. When the rotor 3 is rotated at a rotation speed n in a state in which the magnets 33 are placed in the insertion holes 32, a centrifugal force $F=mr\omega^2$ based on an angular velocity $\omega=2\pi n$ acts on each of the magnets 33. Here, m is the mass of the magnet 33, and r is a rotation radius of the magnet 33, that is, a distance from the axis 3A of the rotor 3 to a center of gravity of the magnet 33 in cross section as illustrated in FIG. 6. The magnet 33 is pressed outward in a radial direction around the axis 3A by the centrifugal force F. At this time, the centrifugal force F acts to push out the resin 34 with which the insertion hole 32 is filled from between a wall surface 321 on an outer side of the insertion hole 32 in the radial direction and the magnet 33. A viscous force τ that pulls the resin 34 together in a direction along the wall surface 321 resists the centrifugal force F, and thus the resin 34 having a thickness t remains between the wall surface 321 and the magnet 33.

Here, while the viscous force τ does not change if viscosity of the resin 34 is constant, the centrifugal force F changes according to the rotation speed n as is clear from the above formula. Therefore, magnitude of the centrifugal force F can be adjusted by appropriately setting the rotation speed n, and the thickness t of the resin 34 between the wall surface 321 of the insertion hole 32 and the magnet 33 can be controlled. For example, when the rotation speed n decreases, the centrifugal force F decreases and the thickness t increases. Since a position of the magnet 33 placed in the insertion hole 32 is farther from the wall surface 321 and closer to the axis 3A as the thickness t increases, the magnet 33 is placed at a position closer to the axis 3A when the rotation speed n further decreases. The same also applies to an opposite case, and the magnet 33 is placed at a position farther from the axis 3A when the rotation speed n further increases.

Therefore, as illustrated in FIGS. 4 and 5, in the second step in which the second rotation speed $n_2$ is relatively large, the resin 34 on an outer side of the magnet 33 in the second group of insertion holes 32B has a relatively small thickness $t_2$, and the magnet 33 is placed at a position farther from the axis 3A. On the other hand, in the third step in which the third rotation speed $n_3$ is relatively small, the resin 34 on an outer side of the magnet 33 in the third group of insertion holes 32C has a relatively large thickness $t_3$, and the magnet 33 is placed at a position closer to the axis 3A. As a result, the mass axis during the rotation of the rotor 3 moves from the unbalance position $P_U$ toward the axis 3A. In this manner, in the embodiment, it is possible to reduce or eliminate the unbalance of the rotor 3, which occurs when the magnet 33 and the resin 34 are placed in the first group of insertion holes 32A in the first step, in the second step and the third step.

Figure 7:
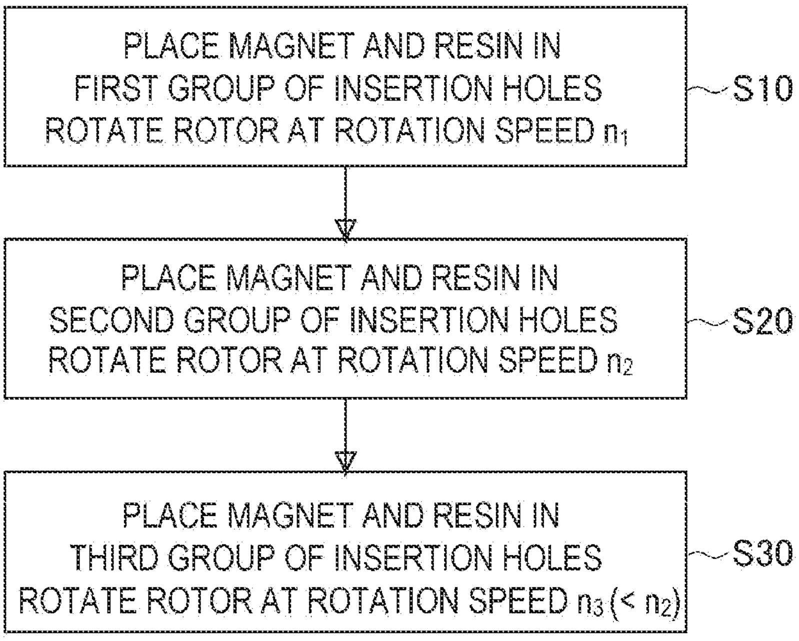
FIG. 7 is a flowchart illustrating steps of the manufacturing method of a rotor described with reference to FIGS. 3 to 5.

FIG. 7 is a flowchart illustrating steps of the manufacturing method of a rotor described with reference to FIGS. 3 to 5. First, in the first step (step S10), the magnets 33 and the resin 34 are placed in the first group of insertion holes 32A, the rotor 3 is rotated at the first rotation speed $n_1$, and the unbalance position $P_U$ is specified when the unbalance occurs in the rotor 3. Next, in the second step (step S20), the magnets 33 and the resin 34 are placed in the second group of insertion holes 32B that are determined based on the unbalance position $P_U$, and the rotor 3 is rotated at the second rotation speed $n_2$. Further, in the third step (step S30), the magnets 33 and the resin 34 are placed in the third group of insertion hole 32C, and the rotor 3 is rotated at the third rotation speed $n_3$ smaller than the second rotation speed $n_2$ in the second step. Another step may be performed, for example, between the first step and the second step and between the second step and the third step, and may be performed before the first step and after the third step. As will be described later, similarly to the third step, a fourth step and subsequent steps in which the rotor 3 is rotated at a rotation speed smaller than that of previous steps may be performed.

In the embodiment of the disclosure as described above, after the second step of rotating the rotor 3 at the second rotation speed $n_2$, the third step of rotating the rotor 3 at the third rotation speed $n_3$ smaller than the second rotation speed $n_2$ is performed. In the second step, the magnet 33 is placed at the position farther from the axis 3A in the second group of insertion holes 32B that are relatively farther from the unbalance position $P_U$, and in the third step, the magnet 33 is placed at the position closer to the axis 3A in the third group of insertion holes 32C that are relatively closer to the unbalance position $P_U$. As a result, the mass axis during the rotation of the rotor 3 moves from the unbalance position $P_U$ toward the axis 3A, and the unbalance of the rotor 3 that occurs at a time of the first step can be reduced or eliminated.

In the embodiment, for example, even if the second rotation speed $n_2$ and the third rotation speed $n_3$ are determined according to the distance d to the unbalance position $P_U$ as in an example to be described later, a process is simplified as compared with a case where a weight or a placement position of each magnet, a filling amount of resin, and the like are determined based on an unbalance weight. Since the second rotation speed $n_2$ and the third rotation speed $n_3$ can also be set to fixed values, the process is further simplified in this case. In the embodiment, since a weight of the magnet 33 does not intended to be changed, a step of reducing or eliminating the unbalance of the rotor 3 does not affect performance of the motor 1.

Hereinafter, a modified example of the embodiment described above will be described.

In the second step and the third step, a movement amount of the mass axis when moving from the unbalance position $P_U$ toward the axis 3A during the rotation of the rotor 3 changes according to a difference between the second rotation speed $n_2$ in the second step and the third rotation speed $n_3$ in the third step. Therefore, when the unbalance position $P_U$ is specified in the first step, the distance d from the axis 3A to the unbalance position $P_U$ may be measured, and one or more of the second rotation speed $n_2$ and the third rotation speed $n_3$ may be determined such that the movement amount of the mass axis in the second step and the third step coincides with or approaches the distance d. For example, the third rotation speed $n_3$ may be determined according to the distance d with the second rotation speed $n_2$ as a fixed value, the second rotation speed $n_2$ may be determined according to the distance d with the third rotation speed $n_3$ as a fixed value, or both the second rotation speed $n_2$ and the third rotation speed $n_3$ may be changed according to the distance d such that an appropriate difference in rotation speed occurs.

Although the unbalance of the rotor 3 can be decreased by setting the second rotation speed $n_2$ and the third rotation speed $n_3$ according to the distance d in this manner, an effect of sufficiently reducing or eliminating the unbalance can be obtained even if the second rotation speed $n_2$ and the third rotation speed $n_3$ are set to fixed values without measuring the distance d. For example, when a small degree of unbalance is allowed as in a drive motor of a vehicle that is intended for quietness, the second rotation speed $n_2$ and the third rotation speed $n_3$ may be set according to the distance d. When a relatively large degree of unbalance is allowed as in a motor of a household electric appliance, the second rotation speed $n_2$ and the third rotation speed $n_3$ may be set to fixed values without measuring the distance d.

One or more of the first rotation speed $n_1$ to the third rotation speed $n_3$ in the first to third steps may be determined according to one or more of the mass m of the magnet 33 and the viscosity of the resin 34. As described above, the centrifugal force $F=mr\omega^2$ acting on the magnet 33 in the insertion hole 32 when the rotor 3 is rotated also changes based on the mass m of the magnet 33 in addition to the angular velocity $\omega=2\pi n$ due to the rotation. The viscous force $\tau$ of the resin 34 that resists the centrifugal force F changes with the viscosity of the resin 34. Therefore, by determining the first rotation speed $n_1$ to the third rotation speed $n_3$ according to one or more of the mass m of the magnet 33 and the viscosity of the resin 34, it is possible to improve the effect of reducing or eliminating the unbalance. For example, when the mass m of the magnet 33 and the viscosity of the resin 34 are substantially constant, or when a relatively large degree of unbalance is allowed as described above, the effect of sufficiently reducing or eliminating the unbalance can be obtained even when the first rotation speed $n_1$ to the third rotation speed $n_3$ are set to fixed values.

A magnitude relationship between the first rotation speed $n_1$ and the second rotation speed $n_2$ in the first and second steps is not limited in one example, and the second rotation speed $n_2$ may be equal to or smaller than the first rotation speed $n_1$. For example, when the second step is performed before the resin 34 with which the first group of insertion holes 32A are filled is cured in the first step, if the second rotation speed $n_2$ is equal to or smaller than the first rotation speed $n_1$, the centrifugal force F acting on the magnet 33 already placed in the first group of insertion holes 32A in the second step does not become larger than the centrifugal force F acting in the first step, and thus the thickness t of the resin 34 between the wall surface 321 and the magnet 33 does not become smaller and the position of the magnet 33 does not change. Such a configuration is effective when the resin is, for example, a thermosetting resin having a low curing rate. Since a next step can be performed without waiting for the curing of the resin 34, time of the process can be shortened. The same also applies to the second step and the third step, and the third step can be performed without waiting for the curing of the resin 34 used for filling in the second step. The second step may be performed after the resin 34 with which the first group of insertion holes 32A are filled is cured in the first step, and in this case, for example, the second rotation speed $n_2$ may be larger than the first rotation speed $n_1$.

Although the first to third steps are performed in the above embodiments, the fourth step and subsequent steps may be performed in another embodiment. In this case, a rotation speed in the fourth step is smaller than the third rotation speed $n_3$ in the third step. Insertion holes 32 in which the magnets 33 are placed in the fourth step are selected from the insertion holes 32 in which the magnets 33 are not placed in the first to third steps. For example, the second group of insertion holes 32B in which the magnets 33 are placed in the second step may be farthest from the unbalance position $P_U$, the third group of insertion holes 32C in which the magnets 33 are placed in the third step may be at intermediate positions with respect to the unbalance position $P_U$, and a fourth group of insertion holes in which the magnets 33 are placed in the fourth step may be closest to the unbalance position $P_U$. The same also applies when a fifth step and subsequent steps are performed.

The embodiments of the disclosure are described in detail above with reference to the accompanying drawings, but the disclosure is not limited to these embodiments. It is evident that those having ordinary knowledge in the technical field to which the disclosure belongs can conceive of various changes or modifications within the scope of the technical concept described in the claims, and it is understood that these changes or modifications also fall within the technical scope of the disclosure.

The invention claimed is:

1. A manufacturing method of a rotor to be used in a motor along with a stator, the manufacturing method of the rotor comprising:

a first step of placing a magnet and resin in each of first insertion holes among a plurality of rotor insertion holes present in the rotor, with the first insertion holes being arranged in a circumferential direction around an axis of the rotor, and identifying an unbalance position of the rotor by rotating the rotor, with the magnets and resin in place in the first insertion holes, at a first rotation speed;

a second step of placing additional magnets and resin in each of second insertion holes present among the plurality of rotor insertion holes, which second insertion holes are among insertion holes of the rotor in which a magnet is not placed in the first step, and rotating the rotor at a second rotation speed, the second insertion holes being relatively far from the unbalance position; and a third step of placing further magnets and resin in each of third insertion holes present among the plurality of rotor insertion holes, which third insertion holes are among insertion holes of the rotor in which a magnet is not placed in each of the first step and the second step, and rotating the rotor at a third rotation speed smaller than the second rotation speed, the third insertion holes being relatively close to the unbalance position.

2. The manufacturing method of the rotor according to claim 1, wherein, in the first step, the magnets and resin are placed in first insertion holes that are positioned at equal intervals in the circumferential direction.

3. The manufacturing method of the rotor according to claim 1, wherein the second rotation speed is equal to or smaller than the first rotation speed.

4. The manufacturing method of the rotor according to claim 1, wherein the method further comprises a step of measuring a distance from the axis to the unbalance position, and determining, with that distance, one or both of the second rotation speed and the third rotation speed.

5. The manufacturing method of the rotor according to claim 4, wherein the step of determining, with that distance, one or both of the second rotation speed and the third rotation speed involves determining both the second rotation speed and the third rotation speed.

6. The manufacturing method of the rotor according to claim 1, further comprising determining, according to one or both of mass of the magnet and viscosity resin, one or more of the first rotation speed, the second rotation speed, and the third rotation speed.

7. The manufacturing method of the rotor according to claim 6, wherein the determining of the one or more of the first rotation speed, the second rotation speed, and the third rotation speed involves consideration of both the mass of the magnet and viscosity of the resin.

8. The manufacturing method of the rotor according to claim 1, wherein the second step is carried out without waiting for the curing of the resin placed in the first step, and while setting the second rotation speed at or below the first rotation speed.

9. The manufacturing method of the rotor according to claim 8, wherein the third step is carried out without waiting for the curing of the resin placed in the second step, and while maintaining the third rotation speed below the second rotation speed.

10. The manufacturing method of the rotor according to claim 1, wherein the third step is carried out without waiting for the curing of the resin placed in the second step, and while maintaining the third rotation speed below the second rotation speed.

11. A manufacturing method of a rotor to be used in a motor along with a stator, the manufacturing method of the rotor comprising:

a first step of placing a magnet and resin in each of first insertion holes present among a plurality of rotor insertion holes prearranged in a circumferential direction round an axis of the rotor, and identifying an unbalance position of the rotor by rotating the rotor, with the magnets and resin placed in the first insertion holes, at a first rotation speed n1;

a second step of placing additional magnets and resin in each of second insertion holes present among the plurality of rotor insertion holes, which second insertion holes are not involved in the first step, and rotating the rotor at a second rotation speed n2; and a third step of placing further magnets and resin in each of third insertion holes of the plurality of rotor insertion holes, which third insertion holes are not involved in the first and second steps, and rotating the rotor at a third rotation speed n3, and wherein the second insertion holes are located farther from the unbalance position than the third insertion holes, and in the second step $n2 \leq n1$, and in the third step $n3 < n2$.

* * * * *